US007991841B2

(12) United States Patent
Anderson et al.

(10) Patent No.: US 7,991,841 B2
(45) Date of Patent: Aug. 2, 2011

(54) TRUST-BASED RECOMMENDATION SYSTEMS

(75) Inventors: Reid M. Anderson, Seattle, WA (US); Christian Herwarth Borgs, Seattle, WA (US); Jennifer Tour Chayes, Seattle, WA (US); Uriel Mordechai Feige, Redmond, WA (US); Abraham Flaxman, Seattle, WA (US); Adam Tauman Kalai, Atlanta, GA (US); Seyed Vahab Mirrokni, Seattle, WA (US); Moshe Tennenholtz, Haifa (IL)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 12/110,625

(22) Filed: Apr. 28, 2008

(65) Prior Publication Data

US 2009/0112989 A1 Apr. 30, 2009

Related U.S. Application Data

(60) Provisional application No. 60/982,169, filed on Oct. 24, 2007.

(51) Int. Cl.
*G06F 15/16* (2006.01)
(52) U.S. Cl. ......... 709/205; 709/212; 709/226; 715/864
(58) Field of Classification Search .................. 709/205, 709/206, 213
See application file for complete search history.

(56) References Cited

U.S. PATENT DOCUMENTS

| | | | |
|---|---|---|---|
| 2002/0091820 A1* | 7/2002 | Hirai .............................. | 709/224 |
| 2002/0174429 A1 | 11/2002 | Gutta et al. | |
| 2004/0054572 A1* | 3/2004 | Oldale et al. .................... | 705/10 |
| 2004/0207636 A1* | 10/2004 | Messer et al. ................. | 345/619 |
| 2005/0171955 A1 | 8/2005 | Hull et al. | |
| 2005/0207631 A1* | 9/2005 | Martens et al. ............... | 382/131 |
| 2005/0210285 A1 | 9/2005 | Williams | |
| 2005/0256866 A1 | 11/2005 | Lu et al. | |
| 2006/0042483 A1 | 3/2006 | Work et al. | |
| 2006/0248573 A1 | 11/2006 | Pannu et al. | |
| 2006/0294192 A1* | 12/2006 | Mao et al. ...................... | 709/213 |
| 2007/0005341 A1* | 1/2007 | Burges et al. ..................... | 704/9 |
| 2007/0023515 A1* | 2/2007 | Urken ........................... | 235/386 |
| 2007/0064626 A1 | 3/2007 | Evans | |
| 2007/0143128 A1 | 6/2007 | Tokarev et al. | |
| 2007/0208613 A1 | 9/2007 | Backer | |
| 2007/0208677 A1* | 9/2007 | Goldberg et al. ............... | 706/13 |

(Continued)

FOREIGN PATENT DOCUMENTS

WO WO2007076297 A2 7/2007

OTHER PUBLICATIONS

Punam Bedi, et al. Trust based Personalized Recommender System http://www.dcc.ufla.br/infocomp/artigos/v5.1/art03.pdf. Last accessed Oct. 30, 2007, 8 pages.

(Continued)

*Primary Examiner* — Wing F Chan
*Assistant Examiner* — Tesfay Yohannes

(57) ABSTRACT

Systems and methods that analyze aggregated item evaluation behavior of users, to suggest a recommendation for the item. An analysis component forms a collective opinion by taking as input votes of users and trusted relationships established therebetween, to output an evaluation and/or recommendation for the item. Accordingly, within a linked structure of nodes, personalized recommendations to users (e.g., agents) are supplied about an item(s) based upon the opinions/reviews of other users, and in conjunction with the declared trust between the users.

20 Claims, 10 Drawing Sheets

U.S. PATENT DOCUMENTS

2007/0214121 A1    9/2007   Ebanks
2007/0250378 A1*  10/2007   Hughes et al. .................. 705/11
2007/0255614 A1*  11/2007   Ourednik et al. ............... 705/10
2008/0228544 A1*   9/2008   Woosley et al. ................. 705/8
2008/0270151 A1*  10/2008   Mahoney et al. ................ 705/1

OTHER PUBLICATIONS

Claudia Hess. Trust-Based Recommendations for Publications : A Multi-Layer Network Approach. TCDL Bulletin, Current 2006, vol. 2 Issue 2. http://www.ieee-tcdl.org/Bulletin/v2n2/hess/hess.html. Last accessed Oct. 30, 2007, 11 pages.

Sukumal Kitisin, et al. Reputation-Based Trust-Aware Recommender System. 1-4244-0423-1/06 IEEE. http://ieeexplore.ieee.org/iel5/4198788/4198789/04198815.pdf?tp=&isnumber=4198789&arnumber=4198815. Last accessed Oct. 30, 2007, 7 pages.

* cited by examiner

TRUST-BASED RECOMMENDATION SYSTEMS

CROSS REFERENCE TO RELATED APPLICATIONS

This application claims the benefit of U.S. Provisional Application Ser. No. 60/982,169 entitled "Trust-Based Recommendation Systems" filed on Oct. 24, 2007. The entirety of this application is hereby incorporated herein by reference.

BACKGROUND

Emergence of global communication networks such as the Internet and major cellular networks has precipitated interaction between users and other network entities. Today, cellular and IP networks are a principal form of communications, and a central medium for interacting with other users for a variety of purposes. Network users now have mechanisms for searching and communicating (or socializing) on virtually any topic of interest.

One such network entity that provides social interaction around common subjects is a social network. In general, social network theory focuses on the relationships and links between individuals or groups of individuals within the network, rather than attributes of individuals or entities. A social network typically consists of links between individuals through which social information/opportunities are exchanged, and personal relationships developed. Such direct, personal relationship implies that two people "know" each other and typically have a certain amount of trust for each other.

For example, a person may be searching for a job and contact friends to determine if they are aware of available positions. Such friends are able to provide reliable information about positions that they know about. Additionally, such friends can recommend their job-seeking friend for available positions, assuming they consider the job-seeking friend to be qualified, reliable, hard working and the like. Furthermore, these direct personal relationships can be employed to obtain social information and/or opportunities, such as for example information about possible romantic partners, movies, restaurants, buying or selling merchandise, recommendations for leisure or professional activities, romance and the like.

Moreover, direct personal relationships can further facilitate obtaining accurate information and opportunities because of the associated reliability of information and individuals being involved. For example, an individual typically is more often willing to swap a vacation home with a friend of a friend—even though the individual may not personally know the friend of a friend—than to house swap with a stranger. A basis for such trust is that the immediate friend can be trusted to offer an honest assessment of the trustworthiness of the third party. Accordingly, social networks can often be relied upon for opinion based information, such as to obtain opinions about activities performed by other users. Such information within a large number of the general populous is typically more relied on, as compared to opinion of an individual expert such as a famous restaurant and movie critic.

Social networks are often difficult to readily employ due to time constraints, wherein it can be time consuming for an individual to contact every person they have a relationship with when searching for information. Moreover, even if individuals can make the searching task easier for themselves, e.g. by creating a massive mailing list of their friends, addressing everyone in that list for each question is highly antisocial and certainly unsustainable as a collective behavior. In general, social networks and the encompassing direct personal relationships include a tremendous amount of latent information and opportunities.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation analyzes aggregate opinions of users regarding an item(s) (e.g., a product) in a trusted network, to suggest a recommendation related to the item—via employing an analysis component. Such analysis component can output a collective evaluation and/or recommendation for the item based on the trust relationship(s) declared by users (e.g., which other users/nodes are trusted by this user), and the voting behavior in the trusted network. As such, within a linked structure of nodes, personalized recommendations to users (e.g., agents) are supplied about an item(s) based upon the opinions/reviews of other users, and in conjunction with the declared trust therebetween. Hence, the subject innovation leverages characteristics of a user, to determine a personalized recommendation for such user based on the vote of nodes in the trust network associated with this user, and further aggregates negative and positive votes of users, into a single vote.

According to a further aspect, the subject innovation can implement an axiomatic approach (e.g., specifying desired properties), wherein class of models can be defined. As such, a set of natural axioms are designated and a subset thereof can be satisfied simultaneously depending upon characteristics of the recommendation system involved, as described in detail infra. The analysis component of the recommendation system forms a collective opinion of the users by analyzing the votes of such users, and relation of trust that is initially declared therebetween.

In a related methodology, each user can designate which other users it trusts, wherein such trust relation can be supplied to the analysis component. Subsequently, a user can opine on a product via a voting process (e.g., casting a "yes" vote or a "no" vote, or a "neutral" vote). By accumulating such votes in conjunction with the already established trust relationship, the opinion of users who have formed judgment about a product can be shared with another user(s) who has indicated trust in such users. Accordingly, for each given user (e.g., represented by a node in the system), other nodes (e.g., other users) that are trusted in the social network can be identified and their collective judgment employed to output a recommendation and/or evaluation for the product. In a related aspect, machine learning systems (e.g., inference components) can employ probabilities to suggest inferred relationships among votes and trust relationships. Such machine learning systems can also be trained (implicitly as well as explicitly) based on a possible identified voting behavior, wherein recommendations for items can be facilitated based on indexes/trends that are derived initially from the aggregate behavior (e.g., voting) of other users.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
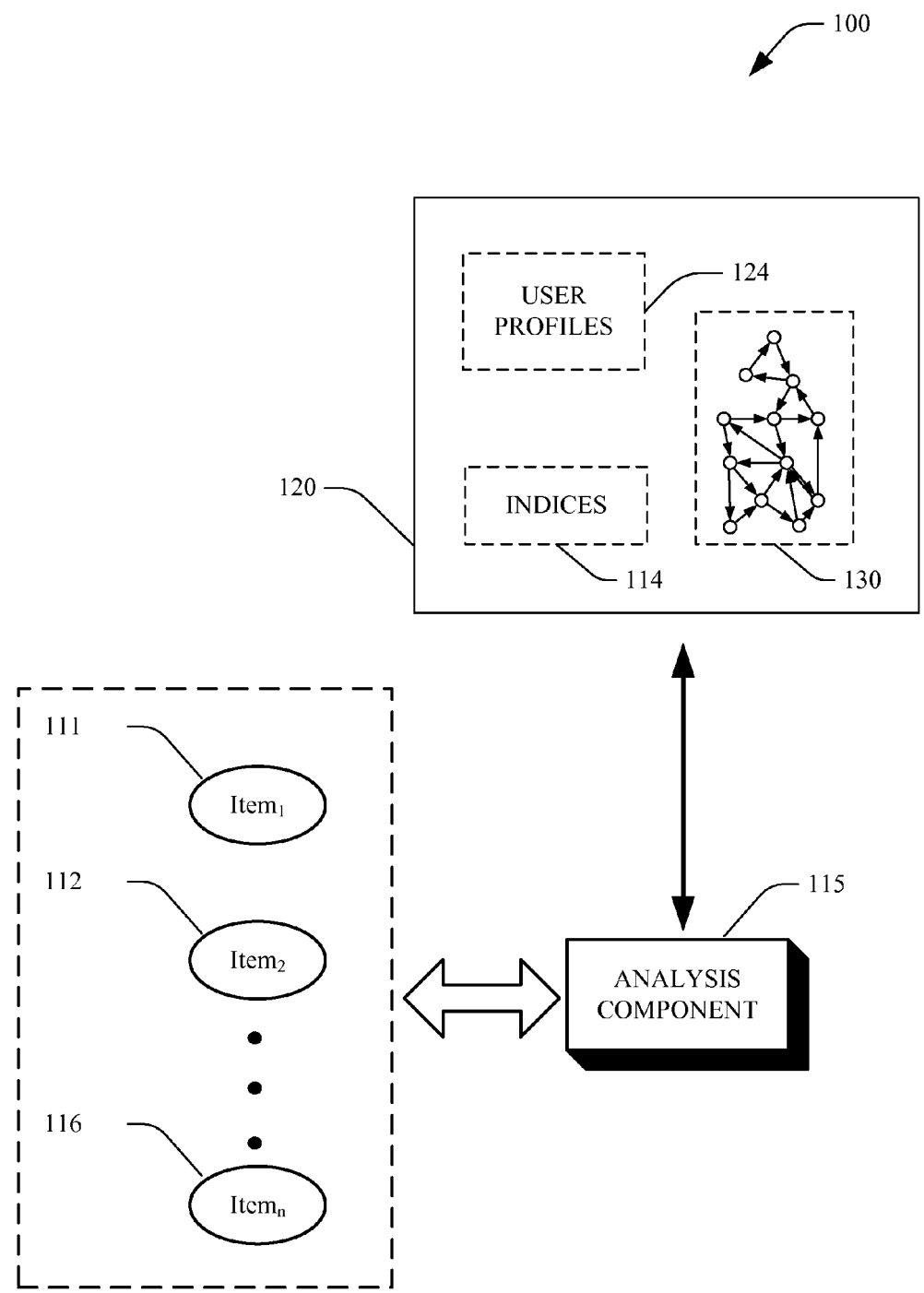
FIG. 1 illustrates a block diagram of a recommendation system that employs an analysis component in a social network to suggest an aggregate recommendation for an item.

FIG. 1 illustrates a block diagram of a recommendation system 100 that analyzes aggregate opinions of users regarding an item(s) (e.g., a product) in a trusted network 130, to suggest a recommendation related to the item by employing an analysis component 115. The computer implemented system of claim 100 can include a storage 120 that stores a variety of data such as for example, user/entity profiles 124, indices 114, and a graph 130 of a social network. The user profiles 124 can contain attributes of individuals or entities (e.g., declared trust relationships) associated with the social network 130, in accordance with an aspect of the subject innovation. The respective profiles can vary as to quantity as well as quality and type of attribute information, and the trust relationships among user/nodes (e.g., which user/nodes trusts which user nodes). For example, such profile information can be directly supplied via each user or node associated with the social network 130. It is to be appreciated that any of a variety of information gathering schemes and sub-schemes (e.g., data mining, cookies, data scavenging, $3^{rd}$ party provider, and the like) can also be employed in connection with collection of such attributes for the indices 114 and user profiles 124.

The graph 130 associated with the social network can represent a collection of information relating to users (e.g. individuals) and relationships therebetween. The graph 130 although pictorially depicted as a graph of vertices and arcs can take many data-structure type forms (e.g., table, relational databases, XML based databases, and the like), and functionally represents intra-relationships between subsets of individuals and/or entities within the social network.

The nodes of the graph 130 can further represent devices that are part of a network (e.g., wireless network) such as a system area network or other type of network, and can include several hosts, (not shown), which can be personal computers, servers or other types of computers. Such hosts generally can be capable of running or executing one or more application-level (or user-level) programs, as well as initiating an I/O request (e.g., I/O reads or writes). In addition, the network can be, for example, an Ethernet LAN, a token ring LAN, or other LAN, or a Wide Area Network (WAN). Moreover, such network can also include hardwired and/or optical and/or wireless connection paths.

In addition, connections can be shared among the users/nodes of the social network, wherein participants can further employ: personal computers, workstations, televisions, telephones, and the like, for example. The networks can further include a plurality of input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters and sub social networks, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. It is to be appreciated that the wireless communication network can be cellular or WLAN communication network; such as Global System for Mobile communication (GSM) networks, Universal Mobile Telecommunication System (UMTS) networks, and wireless Internet Protocol (IP) networks such as Voice over Internet Protocol (VoIP) and IP Data networks.

The analysis component 115 can supply each user a recommendation based on the trust relationship indicated by such user (e.g., which other users/nodes are trusted by this user), and the votes supplied by such other users/nodes. Accordingly, within the graph 130 and the linked structure of nodes, personalized recommendations to users (e.g., agents) can be supplied about an item (or items) 111, 112, 116 (1 thru n, n being an integer). Such recommendations can be based upon the opinions and reviews of other users, as well as declared trust between the users. Hence, the subject innovation leverages characteristics of a user, to determine a personalized recommendation for such user based on the vote of nodes in the trust network around this user, and further aggregate negative and positive vote of users to a single vote. The items 111, 112, 116 can be files, such as photographs, word processing files, spreadsheets, and the like, as well as web pages, emails, retail shopping catalogue/products and any other suitable types of items for which opinion of users can be collected. Such items 111, 112, 116 can further include items of a substantially similar type or items of disparate types, and can be restricted based upon desired implementation. For example, the items 111, 112, 116 can reside within a computer, be associated with item a hard drive, a removable storage media, an application(s), and the like. Moreover, the items 111, 112, 116 can also be related to the Internet or an intranet and merchandise related therewith.

Figure 2:
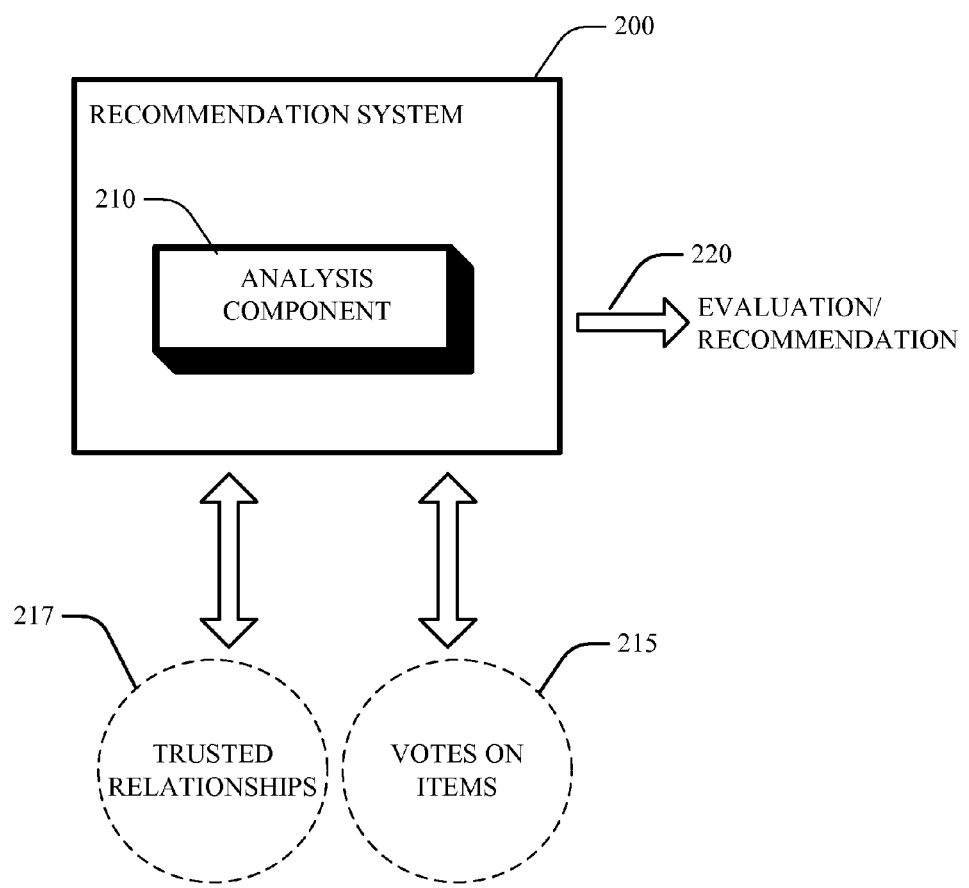
FIG. 2 illustrates a particular block diagram of a recommendation system in accordance with an aspect of the subject innovation.

FIG. 2 illustrates a particular block diagram for a recommendation system 200 in accordance with an aspect of the subject innovation. The analysis component 210 forms a collective opinion by taking as input a vote 215 of users on items, and a trusted relationship established therebetween 217. The analysis component 210 can output an evaluation and/or recommendation 220 for the item.

In a typical application, an item of interest (e.g., a product, service, candidate, restaurant, and the like) can exist, wherein a subset of the agents have prior opinions about such item. Any of the remaining agents can estimate whether such item is of interest and/or value, based on others' opinions. In a practical scenario, a person can first consult other friends for their recommendations. Likewise, such friends (who do not have opinions of their own) can consult other friends. Accordingly, based on cumulative feedback being received, one can form an opinion (e.g., subjective).

An automated trust-based recommendation system of the subject innovation can simulate (or improve upon) such a process to provide high-quality personalized recommendations to agents, wherein the trust network between agents and the opinions of various agents are captured by a directed graph, being in part labeled with "±" votes, where a node represents an agent, an edge from node a to node b represents the fact that agent a trusts agent b, and a subset of the nodes are labeled by "plus" sign or "minus" sign, indicating prior opinions. Such partially labeled graph can be referred to as a voting network, and an algorithm that outputs a recommendation for the unlabeled nodes a recommendation system.

The above can also be referred to as a voting network because such models a variety of two-option voting systems, ranging from: a simple star graph with voters on the outside and final recommendation formed on the inside; to a complex cyclic graph representing a social network. Other voting examples can include voting system that include essentially a tree with the final decision determined at the root.

The analysis component 210 can employ one or more algorithms, as discussed in detail infra in order to supply the evaluation recommendation 220 regarding the item. For example, the analysis component 210 can employ an algorithm based on: a personalized page rank system; random walk system; Min-cut system; local, Global, and Iterative Majority—as described in detail infra. The following definitions can be applied to the recommendation systems of the subject innovation.

Definition 1: A voting network is a directed annotated multi-graph $C=(N, V+, V-, E)$ where N is a set of nodes, $V+$, $V- \subset N$ are disjoint subsets of positive and negative voters, and $\overline{E} \subset N^2$ is a multi-set of edges with parallel edges allowed but no self loops. When $V+$ and $V-$ are clear from context, one can denote the set of voters by $V=V$ "+" $\cup$ V "−" and the set of nonvoters by $\overline{V}=N\setminus V$.

Definition 2: A recommendation system R takes as input a voting network C and source $s \in \overline{V}$ and outputs recommendation $R(C,s) \in \{-, 0, +\}$. Moreover one can denote, $R(G)=(R+(G), R-(G), R0(G))$ where $R+=\{s \in \overline{V} | R(G,s)=+\}$ and similarly for R−, R0.

In addition, the symbol $R \rightarrow \{-, 0, +\}$ can denote the function that computes the sign of its input. Moreover, one can denote by PredE(v) and SuccE(v) the multisets of nodes that point to v and that v points to, respectively.

Given a multiset of recommendations, $S \subset \{-, 0, +\}$, one can define the majority MAJ(S) to be "+", if a strict majority of S is +, and "−" if a strict majority of S is "−", and 0 otherwise, wherein a strict majority can indicate more than half, for example.

It is to be appreciated that a recommendation system can in some ways act similar to a Personalized PageRank System ($F_{PPR}$), wherein output of the systems is targeted at a given source node. However, in personalized ranking systems the goal is to obtain a ranking of the other nodes, whereas in a recommendation system the goal is to provide the source node with a recommendation. Moreover, one can consider recommendation systems that are based on aggregation of feedback according to the level of trust in different nodes. For example, one can apply a personalized ranking systems such as personalized PageRank, and employ its output to build a recommendation. The discussion below outlines examples of recommendation systems, beginning with a system that is based on personalized PageRank.

Definition 3: Given a voting network $C=(V, E, O)$, $s \in V$, and $0<q<1$, let pi, for $i\geq 0$ be a sequence of probability distributions over V. Assuming p0 assign probability 1 to s and probability 0 to every $v' \in V-\{s\}$. For $v \neq s$, $pi(v)=(1-^q)^\Sigma v' \in Pred(v)^p i-1 (v') w(v', v)$ where Pred(v) is the set of predecessors of v and w(v', v) is $$\frac{|\{e \in E : (v(E, v) \in E\}|}{|\{e \in E : (v', v'' \in \text{ for some } v'' \in V\}|}$$

Let $pi(s)=q+(1-q)\_v''\Sigma Pred(s)pi-1(v') w(v', s)$. Let PPR $(v)=\lim_{i \to \infty} pi(v)$. The personalized PageRank recommendation system, FPPR, assigns to s the value 1, $O'(s)=1$, iff$\Sigma\{v \in V:O(v)=1\}$ $PPR(v)>\Sigma\{v \in V:O(v)=-1\}$ $PPR(v)$; FPPR assigns to s the value −1, $O'(s)=-1$, iff$\Sigma\{v \in V:O(v)=-1\}$ $PPR(v)>\Sigma\{v \in V:O(v)=1\}$ $PPR(v)$.

The personalized PageRank ranking systems is a canonical example of a system that acts in a way similar to random walks in order to evaluate the trust of a source node for each other agent, and then the recommendation is based on comparing the trust values of agents who have positive opinion against the trust values of agents who have negative opinions.

Figure 3:
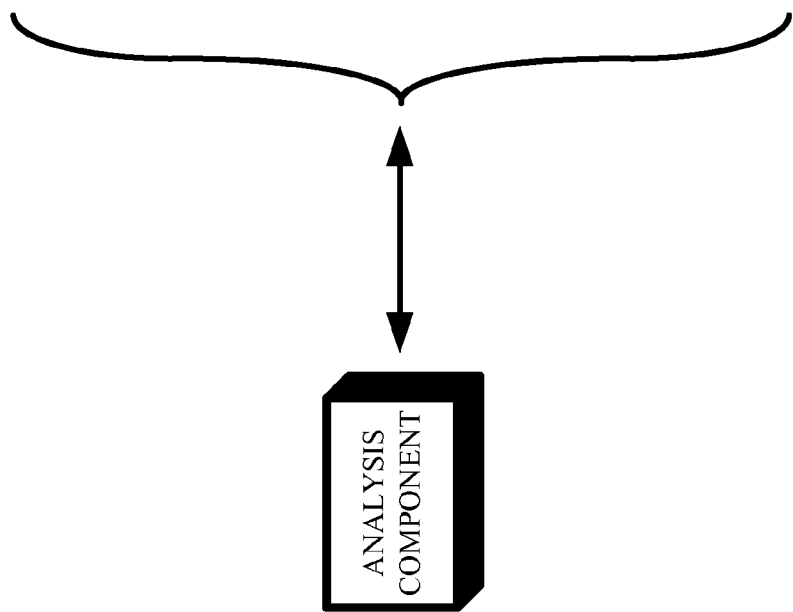
FIG. 3 illustrates an exemplary recommendation system that employs a random walk algorithm in accordance with an aspect of the subject innovation.

It is to be appreciated that the idea of a random walk can further be employed without the use of such "two-phase" approach of FIG. 3. For example, such can be implemented via the recommendation system of Random walk system below:

Random Walk System (FRW)

A recommendation system can be supplied for the case of directed graphs. The recommendation of the system for $G=(N, V+, V_-, E)$ on sources $s \in \overline{V}$ is most easily described in terms of the following random walk. Such originates at node s and, at each step, chooses a random outgoing edge and follows it to the destination node. Such terminates when a node is reached with a ±1 opinion, or when a node with no outgoing edges is reached. Assuming ps is the probability that the random walk terminates at a node with positive opinion, and qs is the probability that the random walk terminates at node with negative opinion.

Let $rs=ps-qs$. (Note that $ps+qs \leq 1$ and it is possible that this random walk never terminates. The random walk recommendation system recommends sgn(rs) to s. In a related aspect the algorithm in FIG. 3 efficiently computes RW's recommendation, wherein such algorithm runs in time polynomial in the number of nodes.

Majority-of-Majorities (FMoM)

In this particular aspect of the subject innovation, a simple system can be defined that is defined when the graph underlying the voting network is a Directed Acyclic Graph (DAG). Nodes in a finite DAG can be partitioned into a finite number of levels. In level 0, nodes have outdegree 0. In each level $i \geqq 1$, nodes have edges only to nodes in level $j<i$. The Majority-of-majorities system assigns a recommendation to each nonvoter in the leaf of 0 and to each voter in level i equal to the majority of the recommendations of its outgoing neighbors (where multiple edges count multiply). Such can easily be computed recursively by an efficient algorithm.

Min-Cut system (FMinCut)

Let $G=(N, V+, V-, E)$ be a voting network. Assuming $E' \subset E$ is the set of edges in E that originate at nonvoters, e.g., eliminate edges out of voters, one can designate that cut $C \subset E'$ is an $V+V-$ cut of G if there is no path from V+ to V− using edges in $E'\backslash C$. It can be designated that C is a min cut of G if its size $|C|$ is minimal among all such cuts.

The min-cut system is defined below. The recommendation of a source "s" is +(resp. −) if and only if in all min-cuts there exists a path from s to V+ (resp. V−) among edges in $E'\backslash C$. If neither is the case, then the recommendation is 0. Such can be easily computed as follows. Compute a mincut C, then, pretend adding an edge from source s to a + (resp. −) voter and compute C+ (resp. C−). If $|C|<|C-|$ then the recommendation is '+'. If $|C|<|C+|$ then the recommendation is '−'. Otherwise, the recommendation is 0. It can be readily observed that such can be computed efficiently. To verify that it correctly computes the above definition, note that if s is connected to V+ in all min-cuts then adding an edge from s to a '−' voter will create a path from V− to V+ in any min-cut and necessarily increase the min-cut cost by 1. Similarly, if s is connected to V− in all min-cuts—in the remaining case, the sizes of all three min-cuts will be the same because there are some min-cuts in which s is not connected to V− and some in which s is not connect to V+.

While classical ranking systems are based on random walk ideas, classical reputation systems as the ones employed by internet companies such as E-Bay™ are based on a more direct comparison of positive and negative counts. Below is included three representative types of such systems: one which employs very strongly the information provided by the source node, namely refers only to the opinions of agents it directly trusts; another which is completely global and incorporates feedback from all agents; and a third one which exploits the structure of the trust network.

Definition 4 Assuming $G=(V,E,O)$, and that $s \in V$. The local majority recommendation system, FLM, is defined by $O'(s)=\text{sign}(|\{e:e=(s, v), O(v)=1\}|-|\{e:e=(s,v),O(v)=-1\})$. As mentioned, the above definition considers only the opinions of agents trusted directly by the source node. The extreme alternative is to treat the information provided by all agents.

Definition 5 Assuming $G=(V,E,O)$, and let $s \in V$. The global majority recommendation system, FGM, is defined by $O'(s)=\text{sign}(|\{v:O(v)=1\}|-|\{v:O(v)=-1\}|)$.

The local majority and global majority recommendation systems employs only limited aspects of the graph structure. The iterative majority recommendation system is described herein, which employs substantially more of the graph structure. In the definition below, a procedural definition can be employed in which the opinions, O, are updated as variables in an iterative manner. A particular variant of iterated majority can be employed where a value $i \neq 0$ can be assigned to a node with current value 0 only if more than half of associated neighbors have opinion i, and use local majority when the iterative procedure stabilizes. Other procedures lead to similar results.

Definition 6 Assuming that $G=(V,E,O)$, and $s \in V$. The iterative majority recommendation system, FIM, is defined by the following procedure.
1. If there exists $t \in V$ such that $|\{e:e=(t, v), O(v)=1\}|>|\{e:e=(t, v)\}, O(v) \neq 1|$ and $O(t)=0$ then let $O(t)=1$ and go to 1.
2. If there exists $t \in V$ such that $|\{e:e=(t, v), O(v)=-1\}|>|\{e:e=(t, v)\}, O(v) \neq -1|$ and $O(t)=0$ then let $O(t)=-1$ and go to 2.
3. $O'(s)=\text{sign}(|\{e:e=(s, v), O(v)=1\}|-|\{e:e=(s, v), O(v)=-1\}|)$ Exemplary axioms that can be implemented according to an aspect of the subject innovation can include:
1. Symmetry, wherein Isomorphic graphs result in corresponding isomorphic recommendations;
2. Neutrality, wherein the system is symmetric with respect to + and − votes;
3. Positive response, wherein if a node's recommendation is 0 and an edge is added to a + voter, then the former's recommendation becomes +; 4. Independence of Irrelevant Stuff (IIS). A node's recommendation is independent of agents not reachable from that node. Recommendations can also be independent of edges leaving voters;
5. Neighborhood consensus. If a nonvoter's neighbors unanimously vote +, then that node can be taken to cast a + vote, as well. If, in a particular graph, a source node is recommended +, then it is said that the source trusts the set of agents that voted + more than those that voted "−". Varying the votes of various subsets of agents, indicates that such relation should be transitive;
6. Transitivity, wherein for any graph (N,E) and disjoint sets $A,B,C \subset N$, relative to any source $s \in V$, if s trusts A more than B, and s trusts B more than C, then s trusts A more than C.

Figure 4:
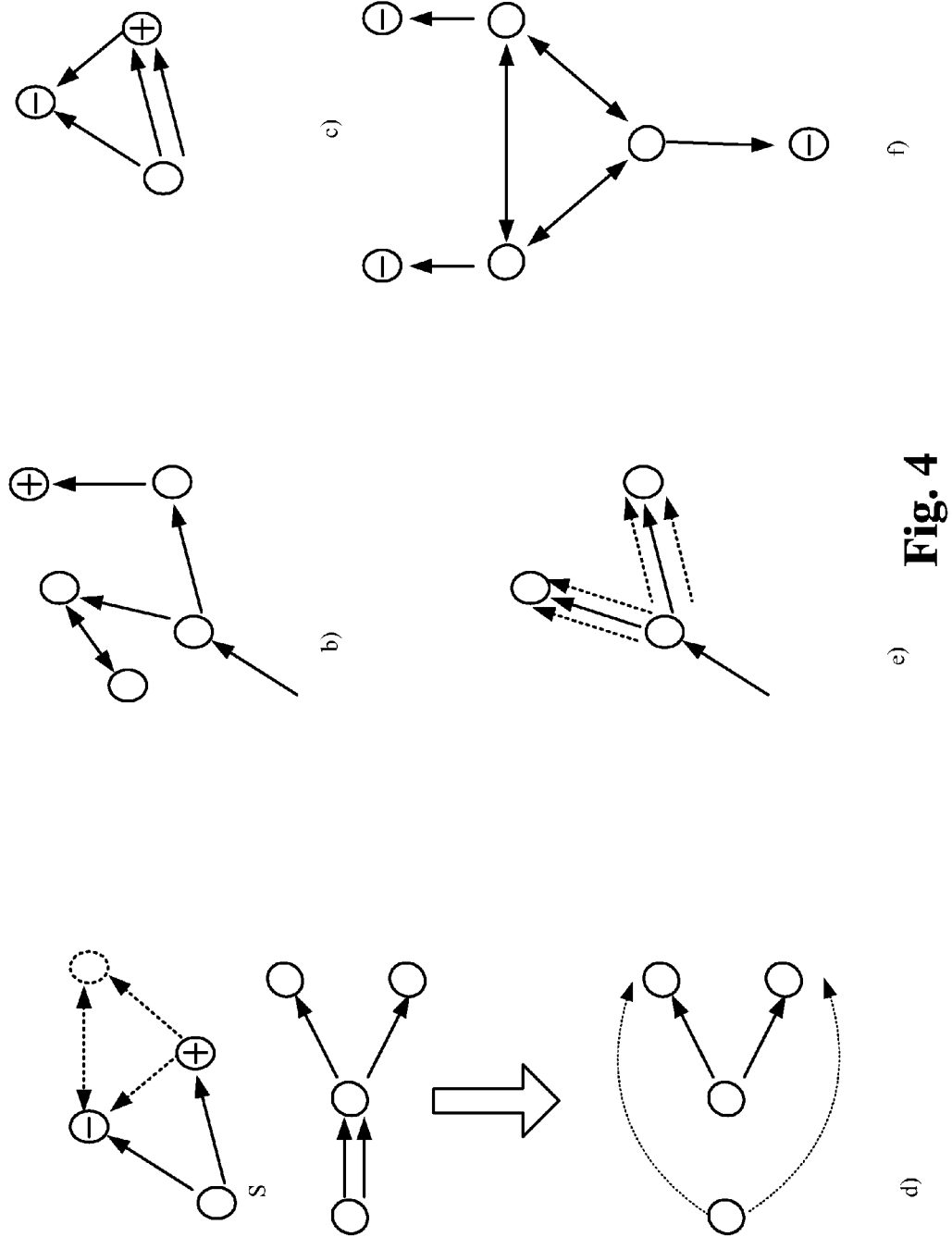
FIG. 4 illustrates voting networks in accordance with an aspect of the subject innovation, wherein labels "±" indicate the votes.

FIG. 4 Illustrates voting networks in accordance with an aspect of the subject innovation, wherein labels ± indicate votes, not recommendations. Accordingly, a-d illustrates:
a) IIS: Node s's recommendation does not depend on any of the dashed node or dashed edges, since unreachable nodes can be ignored as well as edges out of voters. Likewise b) relates to Neighborhood consensus; Node v can be assigned + vote. Similarly, for c) if the recommendation for s is + then it can be indicated that s trusts {v} more than {u}. In addition, d) relates to Trust propagation; The dashed edges of the upper part can be removed and replaced by dashed edges in the lower part. In addition, e) denotes Scale invariance, wherein edges leaving s are tripled without consequence. Similarly, f) can pertain to Groupthink, wherein the three nonvoting nodes cannot all be given + recommendations.

The first two properties, symmetry and neutrality, can be deemed purely structural. Symmetry can designate that names of agents typically do not matter for the source node. Instead, of importance is structure of the trust graph and the opinions provided. Likewise, neutrality can indicate that the values +/− are arbitrary. Put differently, symmetry can be indicated, wherein it can be assumed that $G=(N, V+, V-, E)$. For any permutation $\pi: N \to N$, let $G''$, indicate the isomorphic voting network under $\pi$. Then $R+(G')=\pi(R+(G))$ and $R-(G')=\pi(R-(G))$. Likewise, for neutrality Let $G=(N, V+, V-, E)$ and $G'=(N, V-, V+, E)$. Then $R+(G)=R-(G')$ and $R-(G)=R+(G')$.

Similarly, the positive response axiom states that if a node s has recommendation 0 (or +) and a brand new +−voter is added to the network along with an edge from s to the new node, then new recommendation for 's' should be +. Such reflects a razor's-edge view of a 0 recommendation. The axiom can effectively guide or "push" the systems towards strict recommendations. (Without such an axiom, systems may almost always recommend 0.) Put differently, considering w ∉ N, s ∈ V, G=(N, V+,V−,E), and G'=(N ∪ {w}, V+ ∪ {w}, V−,E ∪ {(s,w)}). If s ∉ R−(G) then s ∈ R+(G').

Moreover, independence of irrelevant Stuff (IIS) axiom captures the semantics of recommendation systems, wherein: a source node is viewed as consulting neighboring agents in the trust graph, who consult their neighbors, for example, while agents who have formed opinions just report their opinion. Such indicates that when considering the recommendation for a particular source node in a particular trust graph, where part of the agents vote (e.g., based on first-hand experience), feedback from these agents is independent of who they trust (e.g., they trust themselves infinitely more than others) and the recommendation system can typically consider only reachable nodes and should ignore links out of voters. For such axiom it can be assumed G=(N, V+, V−, E) and e ∈ V×N be an edge leaving a voter. Then for the subgraph G'=(N, V+, V−, E\{e}) in which e has been removed, R(G)= R(G'). Similarly, if v ∈ N is a node not reachable from s ∈ V, then for the subgraph G" in which node v (and its associated edges) have been removed, R(G,s)=R(G", s). R(G)=R(G'), indicates that the recommendations on the two voting networks are identical.

The following requirement deals with some minimal rationality can be attributed to the agents. It can be assumed that if all the outgoing neighbors of (e.g., agents trusted by) a node v in a trust network vote +, and no other nodes point to v's neighbors, then v can be considered to vote + as well. Put differently, assume G=(N, V+, V−,E). If it is assumed that nonvoter u ∈ V has at least one edge to V+ and no edges to V−∈ V. Suppose further that for each v ∈ SuccE(u), PredE (v)={u}. Let G"=(N, V+ ∈ {u}, V−, E); then R(G)=R(G').

Moreover, transitivity can be considered a central concept in axiomatization of voting. Such can be considered when the underlying trust graph is fixed, while the system needs to deal with more than one item, where different subsets of nodes vote on different items. Accordingly, if a source node is recommended, e.g., +, such can indicate that the system assigns higher trust to the agents that report + than to the agents that report −.

Definition 7 Assuming G=(N, V+, V−,E) is a voting network. If s ∈ E R+(G), then it can be designated that s trusts V+ more than V− relative to multigraph (N,E). Accordingly, a partial ordering among nodes can be generated, and it is desirable that such relation is transitive. This axiom is not only natural, but also builds a strong tie between trust systems and recommendation systems.

Hence, for all multigraphs (N,E), s ∈ V̄, and disjoint A,B,C ⊂ N, if, relative to (N,E), s trusts A more than B and s trusts B more than C, then s trusts A more than C. In a related aspect, the subject innovation reflects degrees of trust, wherein, if u trusts nonvoter v, and v trusts w, edges can be counted. For example, if there are k edges leaving v–that do not point to u-k edges can be removed from u to v and replaced by k new edges from u to the k nodes that v trusts (besides u), and hence no recommendations are changed.

Accordingly, in case of trust propagation axiom for a voting network G=(N, V+, V−, E), distinct u, v ∈ V, it can be assumed that the edges leaving v (besides those to u) are (v,w1), . . . , (v,wk), (wi≠u) for some integer k. Assuming that E contains exactly k copies of (u, v). Then, for E'=E ∪ {(u,w1), . . . , (u,wk)}\{(u, v)*k} and G'=(N, V+, V−,E'), then R(G)=R(G'). Accordingly, one aspect of the subject innovation enables reporting of votes to voting agents that consult therewith, wherein axioms can be defined.

Figure 5:
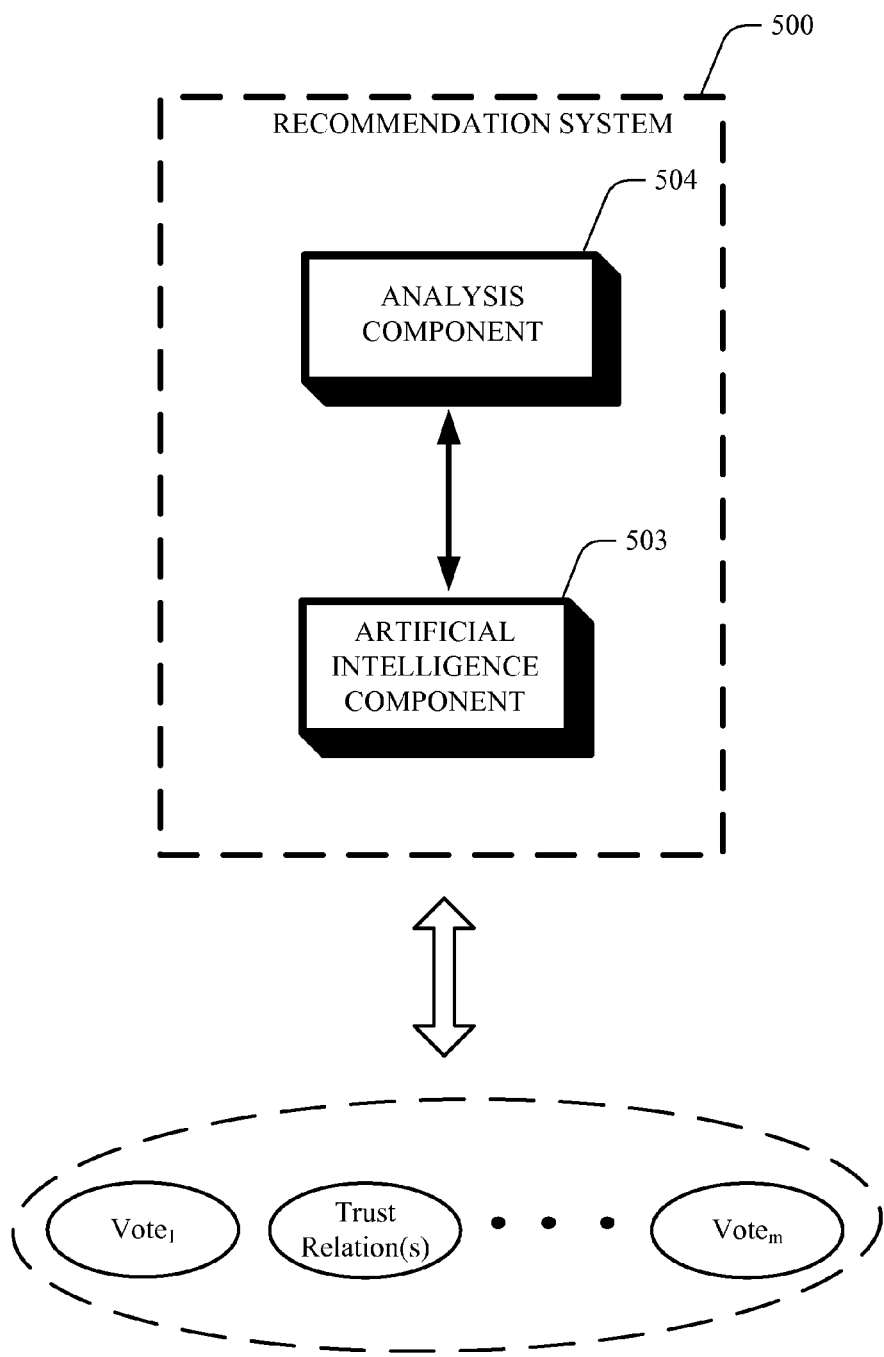
FIG. 5 illustrates a recommendation system that operates in conjunction with the analysis component to supply a recommendation in accordance with an aspect of the subject innovation.

FIG. 5 illustrates a recommendation system 500 that incorporates an artificial intelligence component 503 in conjunction with the analysis component 504, in accordance with an aspect of the subject innovation. For example, a process for analyzing aggregate opinions of users in conjunction with the declared trust relationships can be facilitated via an automatic classifier system and process. A classifier is a function that maps an input attribute vector, x=(x1, x2, x3, x4, xn), to a confidence that the input belongs to a class, that is, f(x)= confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., number of users who vote regarding an item, the reliability of the trust relationships declared, and the like.)

The system 500 can facilitate an automatic interpretation for user preference for an item (e.g., a collective behavior of users in the trust relationship, when evaluating a data.) Such preferences can then be employed as part of evaluating an item in from of a single opinion and/or recommendation that is provided for an item. By exploiting the aggregate behavior of users (e.g., not treating each user as an individual expert) the subject innovation can mitigate noise, and generate relevance judgments from user behavior (e.g., feedback of users in form of votes) and in conjunction with the declared trust relationships. Examples of behavioral characteristics can include quantity of votes for different items, calculation of importance of a node/user with respect to the overall network of nodes/users, and the like. Thus, rather than expecting user(s) to adhere to a predefined set of hierarchical categories, the system allows user(s) to evaluate item(s) and based thereon provide a collective judgment.

Figure 6:
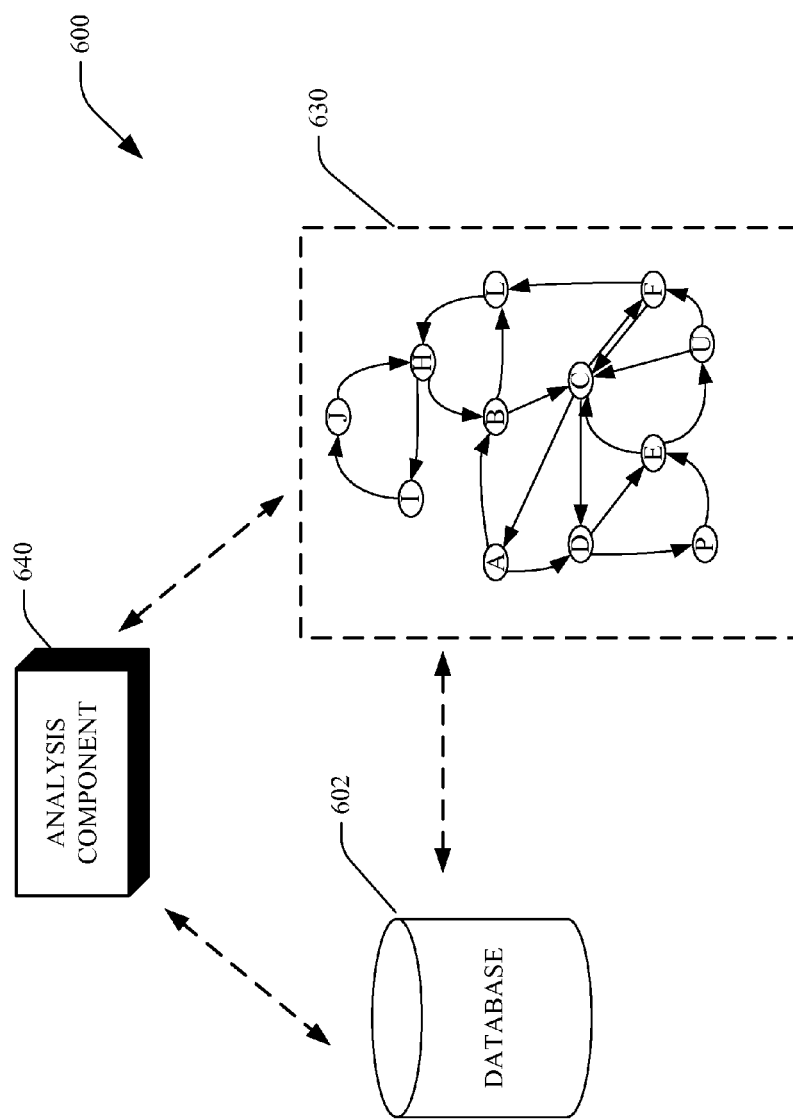
FIG. 6 illustrates an exemplary social network that implements an analysis component in accordance with an aspect of the subject innovation.

FIG. 6 illustrates a computer-implemented system 600 that facilitates aggregation for opinion of users in a trusted social network in accordance with an aspect of the subject innovation. The system 600 includes a database 602 that stores mapping information that maps user interaction information (e.g., users declared trust relations for other users, votes regarding an item) to nodes of the social network 630. The mapping information can be continuously updated and reorganized as links within the system mapping changes (e.g., users changing votes, users added or removed from the network 606, and the like). Graph 630 represents a social network that interacts with the analysis component 640, wherein the social network database 602 stores information relating to social network(s). The analysis component 640 forms a collective opinion by taking as input votes of users and trusted relationships established therebetween, to output an evaluation and/or recommendation for the item. The analysis component 640 can supply each user a recommendation based on the trust relationship indicated by such user (e.g., which other users/nodes are trusted by this user), and the votes supplied by such other users/nodes.

As explained earlier, in the graph 630 individuals and/or entities in a particular social network are represented by vertices (e.g., nodes), and a relationship between two vertices are represented via an arc connecting the vertices. The vertices can be annotated with information (e.g., attributes) about the individual or entity represented by the vertex, in addition to declared trust relationships for other nodes. It is to be appreciated that two or more arcs can be employed with respect to two vertices. More particularly, a unidirectional relationship between a first vertex with respect to a second vertex can be represented by a first arc, and a unidirectional relationship between the second vertex with respect to the first vertex can be represented via a second arc. Moreover, it is to be appreciated that additional arcs could be employed wherein respective arcs can represent unique subsets corresponding to relationships.

For example, an arc points from individual A to individual B indicating that A is familiar with B (e.g., A considers B to be s trusted node such as a "buddy"). Accordingly, individual A is typically willing to rely on individual B in developing an opinion. Moreover, individuals B, C and D comprise a list or buddy list of individual A, implying that A has a trusted relationship with B, C and D. Such relationship of A with respect to B, C and D is illustrated by arcs connecting A to B, C and D. The directionality of the arcs indicate that A contacts B and D for information and is contacted by C for information. Individuals C and F are depicted via two arcs as having a common pair of relationships, wherein each individual (C and F) considers the other a buddy or friend, and is willing to contact each other for information and is willing to provide information to each other, wherein such pair of relationships can also be referred to as a bidirectional relationship. It is to be appreciated that any of a number of suitable algorithms, programs and/or relational database schemes to effect the functionality associated with graph 630 can be employed, to supply a collective judgment, as described in detail supra. Accordingly, within a linked structure of nodes, personalized recommendations to users (e.g., agents) are supplied about an item (or items) based upon the opinions/reviews of other users, and in conjunction with the declared trust between the users. Hence, the subject innovation leverages characteristics of a user, to determine a personalized recommendation for such user based on the vote of nodes in the trust network around this user, and further aggregate negative and positive vote of users to a single vote.

Figure 7:
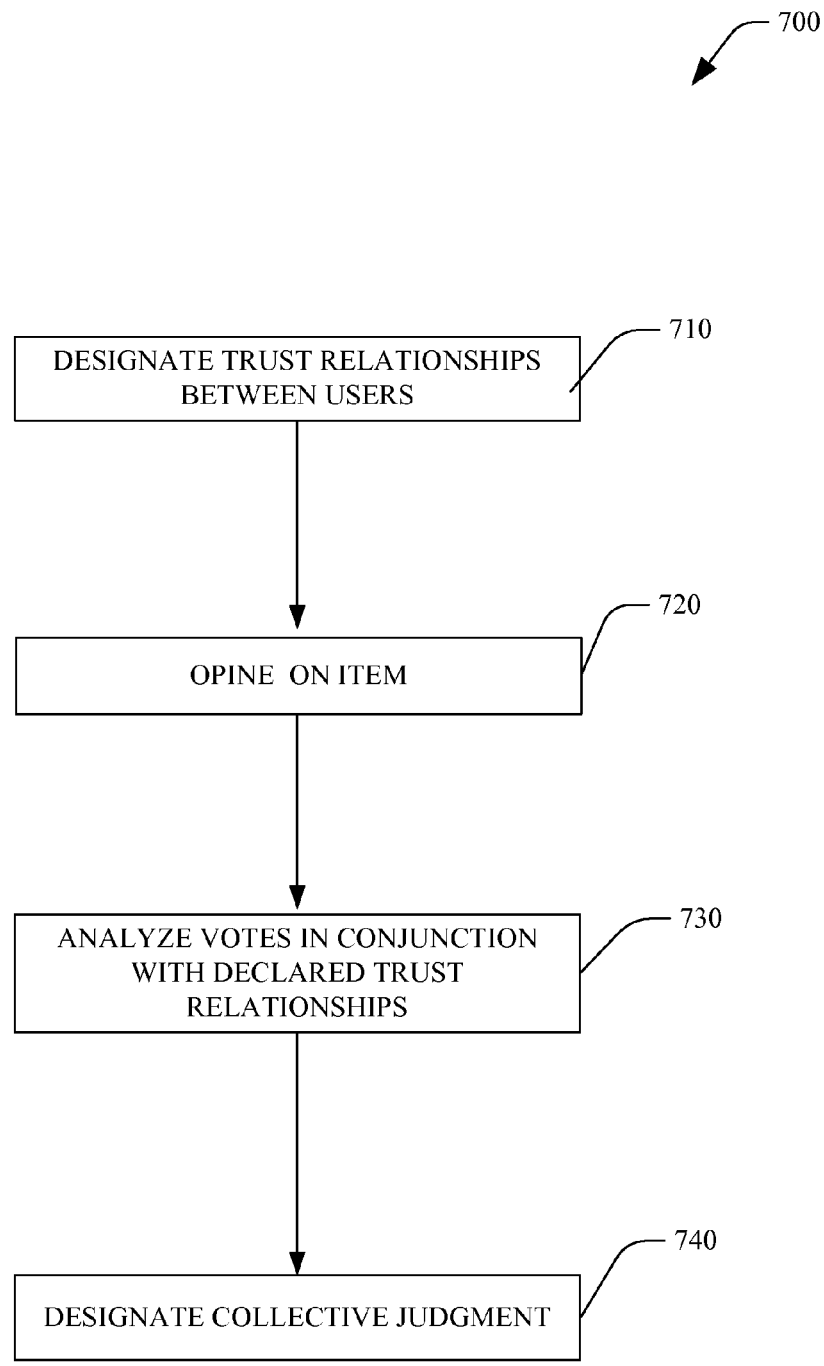
FIG. 7 illustrates a related methodology of supplying an evaluation and/or recommendation for an item in a trusted network in accordance with an aspect of the subject innovation.

FIG. 7 illustrates a related methodology 700 of analyzing aggregate user behavior, to derive a recommendation for an item in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 710 each user can designate which other users it trusts, wherein such trust relation can be supplied to the analysis component. Subsequently and at 720, a user can opine on a product e.g. a voting process (e.g., casting a "yes" vote or a "no" vote", or a "neutral" vote). By analyzing accumulated votes in conjunction with the already established trust relationship at 730, a collective evaluation can be designated at 740. Accordingly, for each given user (e.g., represented by a node in the system), other nodes (e.g., other users) that are trusted in the social network can be identified and their collective judgment employed to output a recommendation and/or evaluation for the product.

Figure 8:
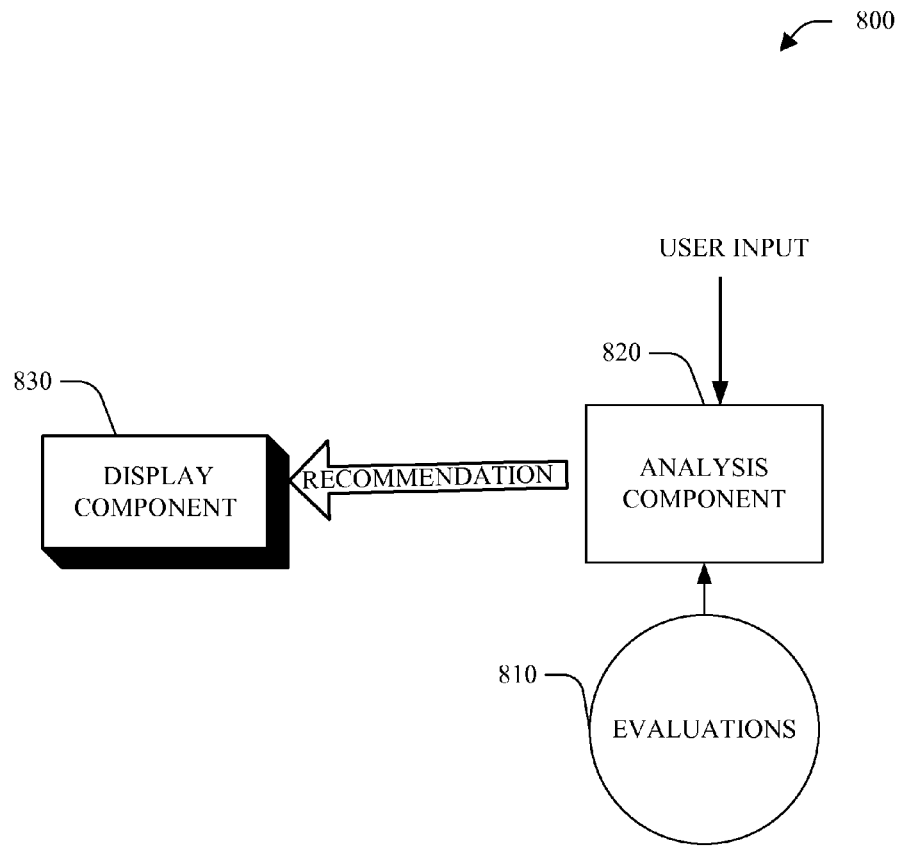
FIG. 8 illustrates an exemplary display component for presentation of recommendations in accordance with an aspect of the subject innovation.

FIG. 8 illustrates an exemplary display component 830 that displays a recommendation (e.g., as a single vote) for an item to users, as part of a recommendation system 800. The display component 830 can further display one or more trust relationships that were declared between users. Moreover, an item can initially be evaluated (e.g., voted on) by a plurality of users in a trusted network, by supplying evaluations 810. Within such linked structure of nodes, personalized recommendations to users (e.g., agents) are supplied about an item (or items) based upon the opinions/reviews of other users, and in conjunction with the declared trust between the users.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

As used in this application, the terms "component", "system", are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
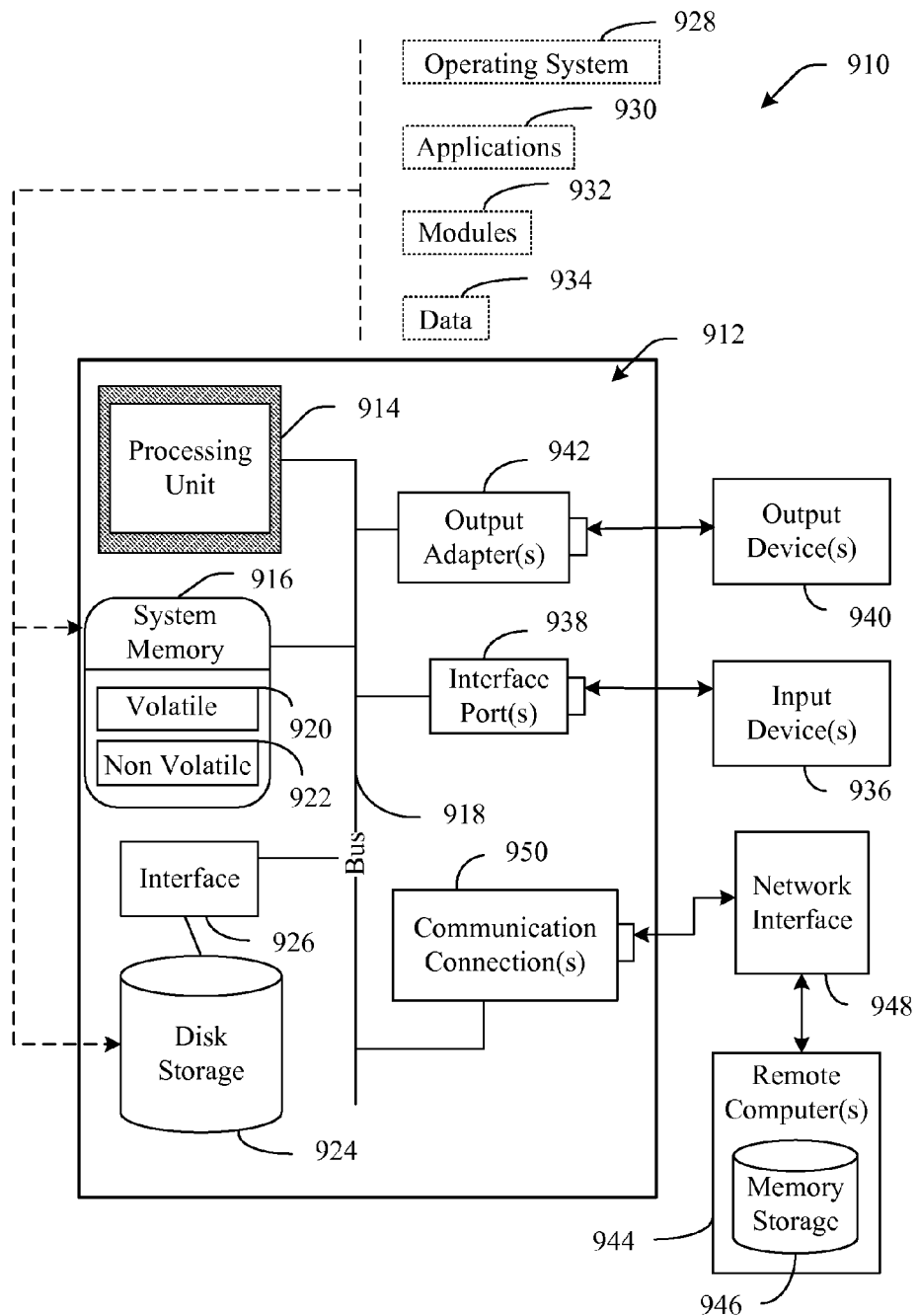
FIG. 9 illustrates an exemplary environment for implementing various aspects of the subject innovation.
Figure 10:
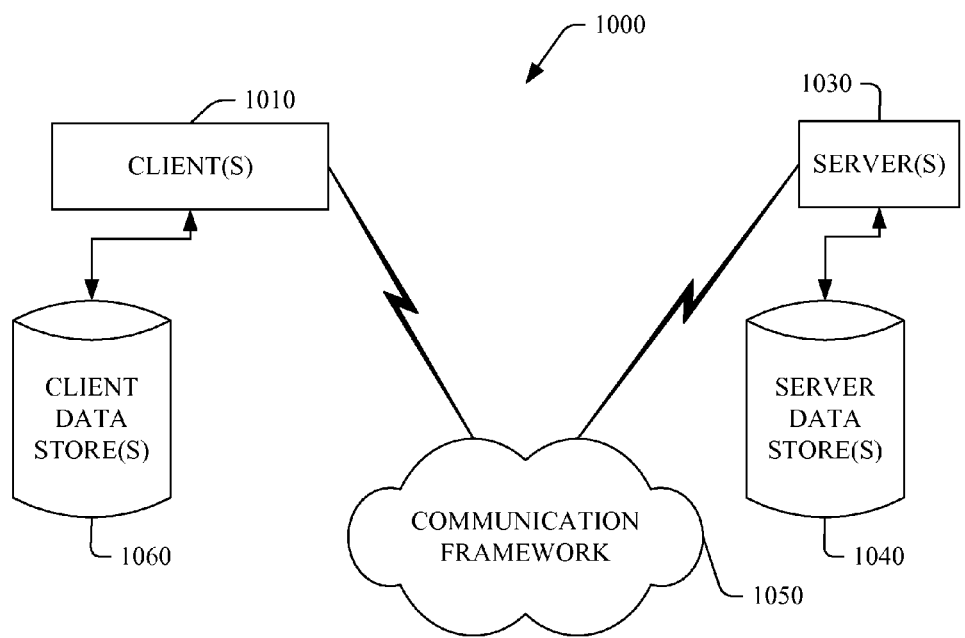
FIG. 10 is a schematic block diagram of a sample computing environment that can be employed for a recommendation system according to an aspect of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. For example, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for the recommendation system, in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising:
    at least one processor;
    a network of nodes and edges, each of the nodes representing a user of a plurality of users in a social network and each of the edges representing a trust relationship between users of the plurality of users;
    the following computer executable components, executable by the at least one processor: a component that receives trust relationships declared between users of the plurality of users, thereby maintaining the network of nodes and edges; and
    an analysis component associated with the network to supply an aggregate recommendation for an item to a first user of the plurality of users, the aggregate recommendation being based in part on votes relating to the item designated by a portion of the users, the portion comprising one or more second users selected such that the network comprises a path along the edges of the network from a node representing the first user to a node representing the second user, the analysis component aggregating the votes based in part on trust relationships among the first user and the one or more second users.

2. The computer implemented system of claim 1, the votes including a "yes" vote, or a "no" vote, or a "neutral" vote.

3. The computer implemented system of claim 2 further comprising a machine learning system that infers relationships among the votes and the trust relationships.

4. The computer implemented system of claim 2 further comprising an axiomatic property that defines class models.

5. The computer implemented system of claim 4 wherein the network comprises a directed acyclic graph.

6. The computer implemented system of claim 4, wherein the analysis component comprises a Random Walk System (FRW) system.

7. The computer implemented system of claim 4, wherein the analysis component comprises a Majority-of-Majorities (FMoM) system.

8. The computer implemented system of claim 4, wherein the analysis component applies a positive response axiom.

9. The computer implemented system of claim 4, wherein the analysis component comprises a Min-cut system (Fmincut).

10. A computer implemented method of supplying a recommendation for an item comprising:
    with at least one processor:
        receiving user input declaring trust relationships between a plurality of nodes in a network;
        receiving user input supplying a vote(s) by a node regarding an item;
        receiving user input identifying a node of the plurality of nodes; and
        designating a collective opinion of the plurality of nodes for the selected node, the collective opinion being based on the trust relationships and the vote(s), the designating comprising combining, based on the declared trust relationships, votes regarding the item by nodes linked to the selected node through the declared trust relationships.

11. The computer implemented method of claim 10 further comprising defining class models for the network.

12. The computer implemented method of claim 10 further comprising identifying a set of natural axioms for the network.

13. The computer implemented method of claim 10, further comprising supplying a Directed Acylic Graph and partitioning the node into a finite number of levels.

14. The computer implemented method of claim 12 further comprising designating the set of natural axioms.

15. The computer implemented method of claim 12 further comprising outputting a recommendation for the item.

16. The computer implemented method of claim 12 further comprising aggregating opinions of users via classifiers.

17. The computer implemented method of claim 12 further comprising mapping user interaction information to nodes of a social network.

18. The computer implemented method of claim 17 further comprising updating the mapping act.

19. The computer implemented method of claim 12 further comprising indicating relationships as arcs between nodes.

20. A computer implemented system comprising:
    at least one processor;
    means for implementing a social network, the means connecting a plurality of nodes to represent trust relationships declared by members of the social network for other members of the social network and the means further maintaining recommendations from each of plurality of members of the social network, the recommendations relating to an item; and means for producing a recommendation on the item for a member represented by a node in the network, the recommendation being based on the recommendations of other members linked to the member through declared trust relationships and on the declared trust relationships, such that different members receive different recommendations.

* * * * *